Sept. 27, 1949.   E. W. MORTIMER   2,483,295
MOUNTING OF GRAMOPHONE UNITS
Filed Jan. 17, 1945

Inventor
Edmund Walter Mortimer
BY
his Attorney

Patented Sept. 27, 1949

2,483,295

UNITED STATES PATENT OFFICE 2,483,295

MOUNTING OF GRAMOPHONE UNITS

Edmund Walter Mortimer, Swindon, England, assignor to The Garrard Engineering and Manufacturing Company Limited, Swindon, Wiltshire, England Application January 17, 1945, Serial No. 573,275
In Great Britain February 2, 1944

1 Claim. (Cl. 248—18)

This invention relates to the mounting of gramophone units to the motor board or supporting member in radio gramophone cabinets, the object being to provide an improved resilient mounting of the unit whereby vibrations of the loud speaker or other components of a radio amplifier are isolated from the pick-up.

According to the invention the means by which the gramophone unit is coupled to the supporting member comprises a plurality of resilient elements which extend in a direction parallel or substantially parallel to the plane of the support.

The resilient elements may comprise coiled tension springs.

Means may be provided for varying the points of attachment of the springs or their tension in order to adjust the level of the gramophone unit.

Instead of mechanical springs resilient rubber elements may be located between the unit and the support and be bonded thereto.

Figure 1:
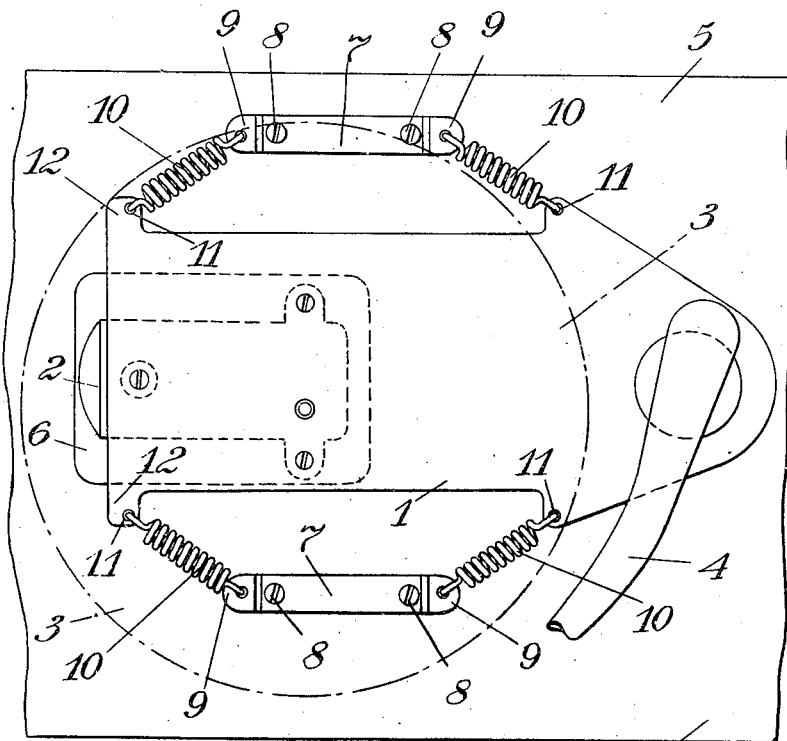
Figure 1 is a plan.
Figure 2:
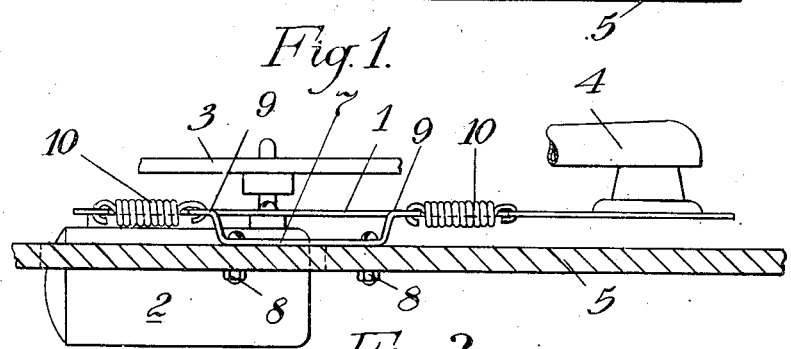
Figure 2 is an elevation of the improved mounting according to the invention.

In carrying the invention into effect according to one convenient mode by way of example, a unit plate 1 is provided upon which the radio gramophone unit is carried, said unit comprising a gramophone motor 2, turntable 3, pick-up 4 and the associated mechanism to operate the automatic switch and other complementary mechanism (not shown). The unit plate 1 may be of elongated shape and is mounted above the motor board or support 5 in spaced relation therewith, the board being provided with a hole 6 to accommodate the motor 2 which is secured beneath the unit plate 1.

The unit plate 1 is located between a pair of suspension spring brackets 7 which are secured to the motor board or support 5 by bolts or screws 8, the brackets being spaced from the sides of the unit plate.

The brackets 7 are bent up or cranked at their ends 9 to provide anchorages for suspension members comprising coiled tension springs 10, the cranked ends rising from the motor board or support 5 a distance conforming to the desired spacing of the unit from the motor board. The cranked ends 9 of the brackets are provided with holes or are hooked to accommodate the ends of the suspension members 10, the other ends of which are hooked into apertures 11 in lateral lugs 12 on the unit plate.

The axes of the suspension springs 10 extend at any suitable angle to the unit plate 1, for example about 40°, the arrangement being such that the springs lie substantially in the plane of the unit plate.

In order that the unit plate 1 with its supported elements may lie level means may be provided for individually adjusting the tension of the springs 10, for example by an adjustment of the anchorage points for which purpose the suspension spring brackets 7 may each be formed in two parts.

Instead of the brackets 7 pillars may be provided which may be adjustably mounted on the motor board or support.

It will be obvious that any other suitable number of suspension springs, instead of four, may be provided, with additional spring suspension brackets if necessary.

Instead of coiled mechanical springs, resilient rubber elements may be provided bonded between the unit plate and suspension brackets for attachment to the motor board or support.

By means of the invention the gramophone unit is supported in a floating manner so that vibrations from the loud speaker or other source are not transmitted to the pick-up.

I claim:

A mounting for a gramophone unit comprising a horizontally extending unit plate supporting the gramophone motor, turntable, pick-up and associated automatic switch mechanism, a supporting member, a plurality of cranked bracket elements having horizontally extending surfaces rigidly secured to said supporting member, a plurality of coiled tension springs, and means for attaching said coiled tension springs at one end of each thereof to said unit plate and to said horizontally extending surfaces of the bracket elements at the other end of each thereof whereby the axes of said springs lie in a substantially horizontal plane.

EDMUND WALTER MORTIMER.

REFERENCES CITED

The following references are of record in the file of this patent:

UNITED STATES PATENTS

| Number | Name | Date |
|---|---|---|
| 968,787 | Norton | Aug. 30, 1910 |
| 977,523 | Gustafson | Dec. 6, 1910 |
| 1,377,556 | Bridgman | May 10, 1921 |
| 1,653,109 | Kreitemeyer | Dec. 20, 1927 |
| 1,880,992 | Sperling | Oct. 4, 1932 |
| 2,311,396 | Judkins | Feb. 16, 1943 |